United States Patent [19]

Stedman

[11] 4,411,329
[45] Oct. 25, 1983

[54] VEHICLE WITH MULTI-DIRECTIONAL MOVEMENT CAPABILITIES

[75] Inventor: Robert N. Stedman, Chillicothe, Ill.

[73] Assignee: Caterpillar Tractor Co., Peoria, Ill.

[21] Appl. No.: 355,098

[22] PCT Filed: Jan. 11, 1982

[86] PCT No.: PCT/US82/00028
§ 371 Date: Jan. 11, 1982
§ 102(e) Date: Jan. 11, 1982

[87] PCT Pub. No.: WO83/02431
PCT Pub. Date: Jul. 21, 1983

[51] Int. Cl.³ .................... B62D 57/00; B60B 19/00
[52] U.S. Cl. .................... 180/7 R; 180/257; 280/28.5; 301/5 R; 305/60
[58] Field of Search ........... 180/7 R, 8 F, 140, 257, 180/258, 260; 280/28.5; 301/5 R; 305/60

[56] References Cited
U.S. PATENT DOCUMENTS

| | | | |
|---|---|---|---|
| 1,282,598 | 10/1918 | Lamb | 180/258 |
| 2,752,058 | 6/1956 | Gibson | 414/664 X |
| 2,999,554 | 9/1961 | Wagner | 180/6.48 |
| 3,001,601 | 9/1961 | Aghnides | 180/7 R |
| 3,039,268 | 6/1962 | Shaffer | 60/53 |
| 3,212,594 | 10/1965 | Scott | 180/7 R |
| 3,243,194 | 3/1966 | Trusock | 280/43.12 |
| 3,273,665 | 9/1966 | Goodacre | 180/85 |
| 3,306,390 | 2/1967 | Jamme | 180/140 |
| 3,364,874 | 1/1968 | Toennesen | 180/7 R |
| 3,388,820 | 6/1968 | Lebre | 187/9 R X |
| 3,586,183 | 6/1971 | Shaffer | 214/75 G |
| 3,601,422 | 8/1971 | Woods | 280/91 |
| 3,655,005 | 4/1972 | Chicurel | 180/7 R |
| 3,908,849 | 9/1975 | Carroll | 214/672 |
| 3,915,252 | 10/1975 | Datta et al. | 180/72 |

Primary Examiner—Joseph F. Peters, Jr.
Assistant Examiner—Donn McGiehan
Attorney, Agent, or Firm—Phillips, Moore, Lempio & Finley

[57] ABSTRACT

Mobile vehicles, such as lift trucks, are normally mounted on pairs of front and rear wheels for locomotion purposes. The rear wheels are steerable to move the truck into various work positions. However, the turning radius and maneuverability of vehicles of this type are limited, particularly when working in narrow aisles. The vehicle (10) of the present invention includes a frame assembly (13), a plurality of wheels (72,74) mounted on the frame assembly (13) for universal movement about a pivot point (110), and a support and drive system (70) for driving the wheels (72,74) and for infinitely positioning the wheels (72,74) relative to a supporting surface (11) to move the vehicle (10) in any chosen direction.

47 Claims, 9 Drawing Figures

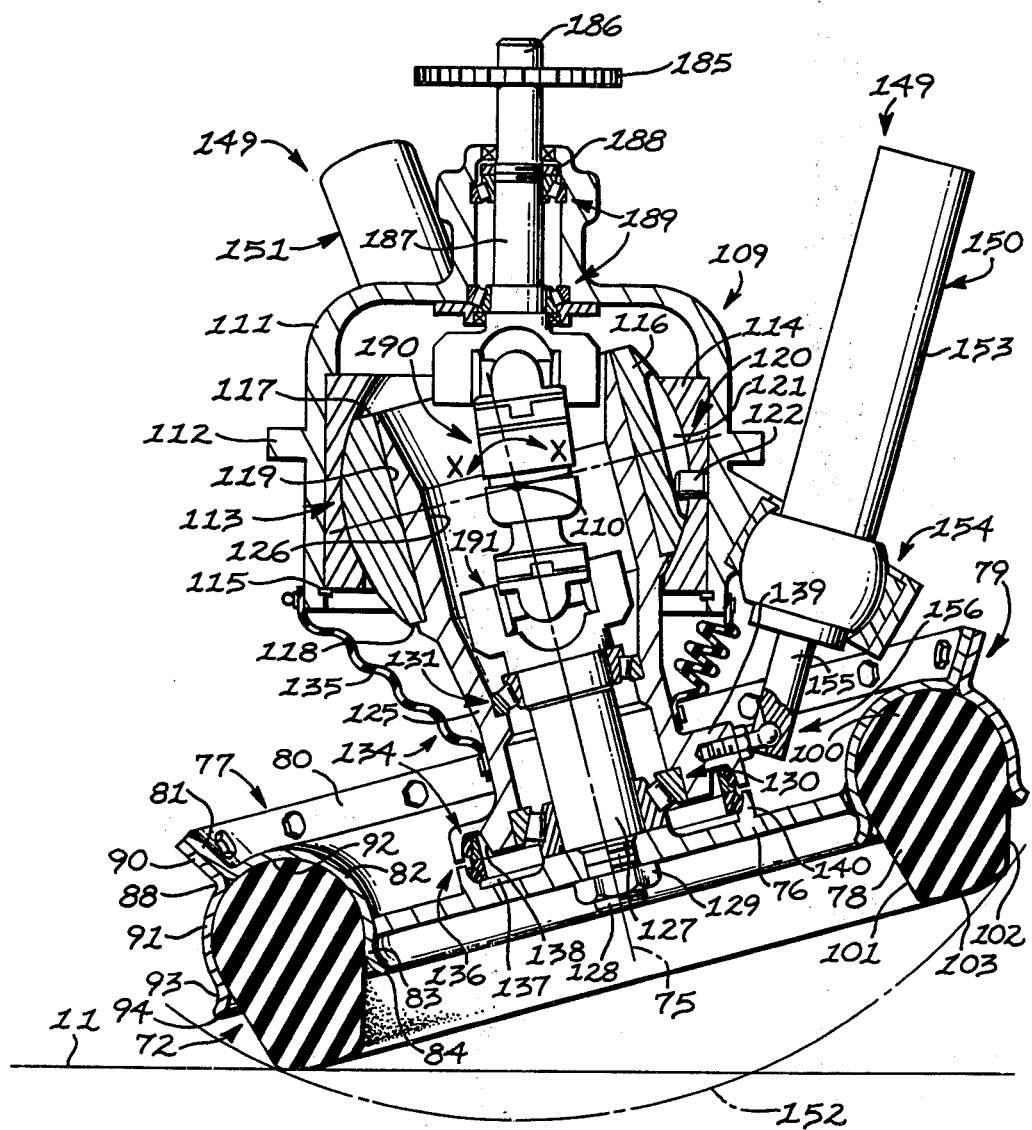

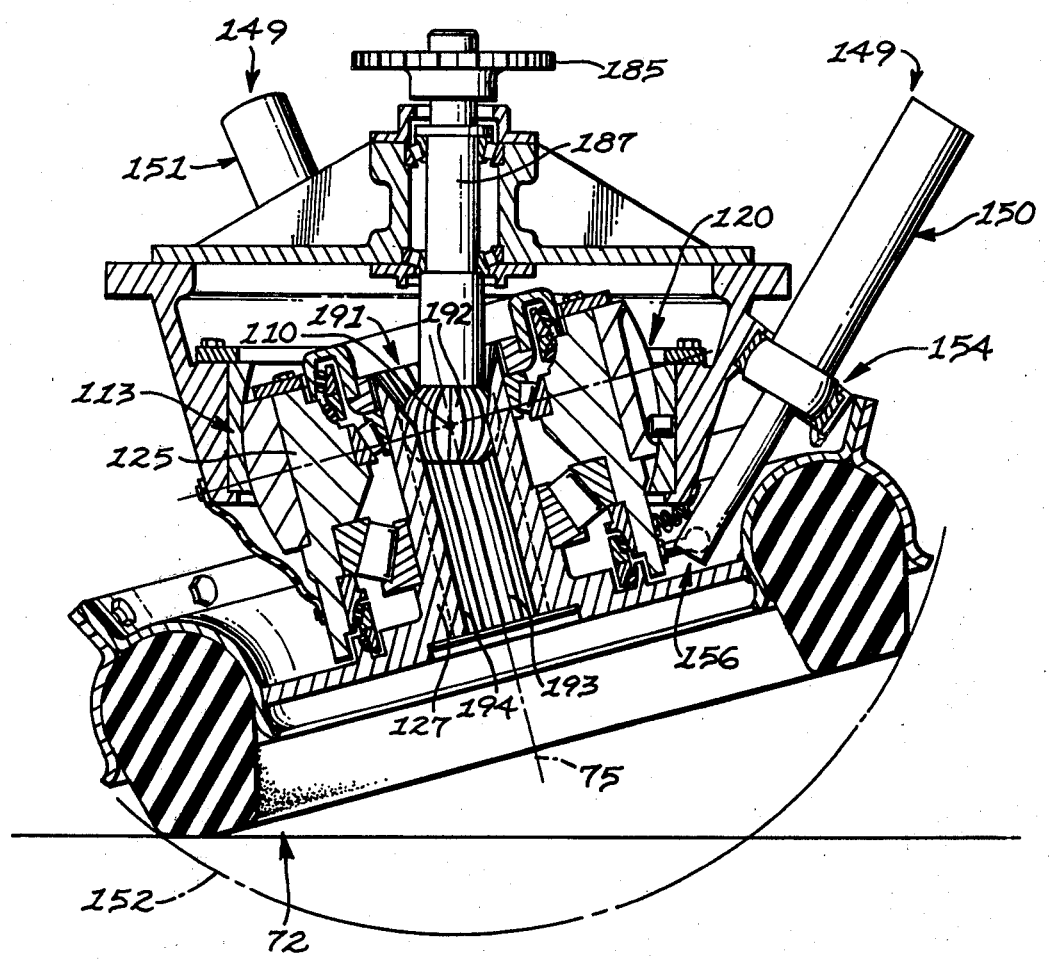

VEHICLE WITH MULTI-DIRECTIONAL MOVEMENT CAPABILITIES

TECHNICAL FIELD

This invention relates generally to a vehicle having multi-directional movement capabilities and more particularly to a vehicle having wheels which are universally mounted thereon and selectively tiltable relative to ground level to select the direction of movement of the vehicle.

BACKGROUND ART

Mobile vehicles, such as lift trucks, are normally mounted on pairs of front and rear wheels for locomotion purposes. The rear pair of wheels of a lift truck are normally steerable to guide the truck into various work positions. Although lift trucks of this type function satisfactorily, their turn radius and maneuverability, especially in narrow aisles, is limited due to the standard steer axle arrangement wherein steerable wheels are pivotally mounted on a frame of a truck by vertically disposed king pins.

Attempts have been made to provide vehicles of this type with multi-directional capabilities by modifying the ground engaging or tractive components thereof. For example, U.S. Pat. No. 2,999,554, issued on Sept. 12, 1961 to J. H. Wagner, discloses a vehicle having endless treads for selectively moving a vehicle in different directions by adjusting the orientation of the treads relative to ground level. However, endless treads of this type have a limited turning radius and maneuverability because they are positionable relative to the ground level or supporting surface only in a direction either parallel to or normal to the longitudinal axis of the vehicle. In addition, such vehicles are relatively slow in their travel and direction change.

The present invention is directed to overcoming one or more of the problems as set forth above.

DISCLOSURE OF THE INVENTION

In one aspect of the present invention, a vehicle is provided with multi-directional movement capabilities on a supporting surface or floor. The vehicle includes a frame comprising a rear frame and a pair of front frames pivotally connected to the rear frame, a plurality of wheels rotatably mounted on the frame, and drive means for selectively rotating at least one of the wheels. Each wheel is mounted on the frame for universal movement about a pivot point and means are provided for selectively and universally positioning each of the wheels relative to the supporting surface to move the vehicle in any chosen direction. Other aspects of this invention include various subcombinations of the vehicle, including its drive system, wheel mounting arrangement, and wheel construction.

The improved vehicle embodying this invention will thus exhibit universal movement capabilities whereby the vehicle can maneuver in close quarters expeditiously, will exhibit a relatively small turning radius, and will further exhibit a high degree of stability during roading and when stopped for work performing purposes.

The foregoing and other aspects will become apparent from the following detailed description of the invention when considered in conjunction with the accompanying drawings. It is to be expressly understood, however, that the drawings are not intended as a definition of the invention, but are for the purposes of illustration only.

BRIEF DESCRIPTION OF THE DRAWINGS

In the drawings:

FIG. 8 is an enlarged sectional view, similar to that shown in FIG. 5, illustrating a mounting and drive arrangement for one of the wheels; and FIG. 9 is a view similar to FIG. 8, but illustrates an alternative mounting and drive arrangement.

BEST MODE FOR CARRYING OUT THE INVENTION

Figure 1:
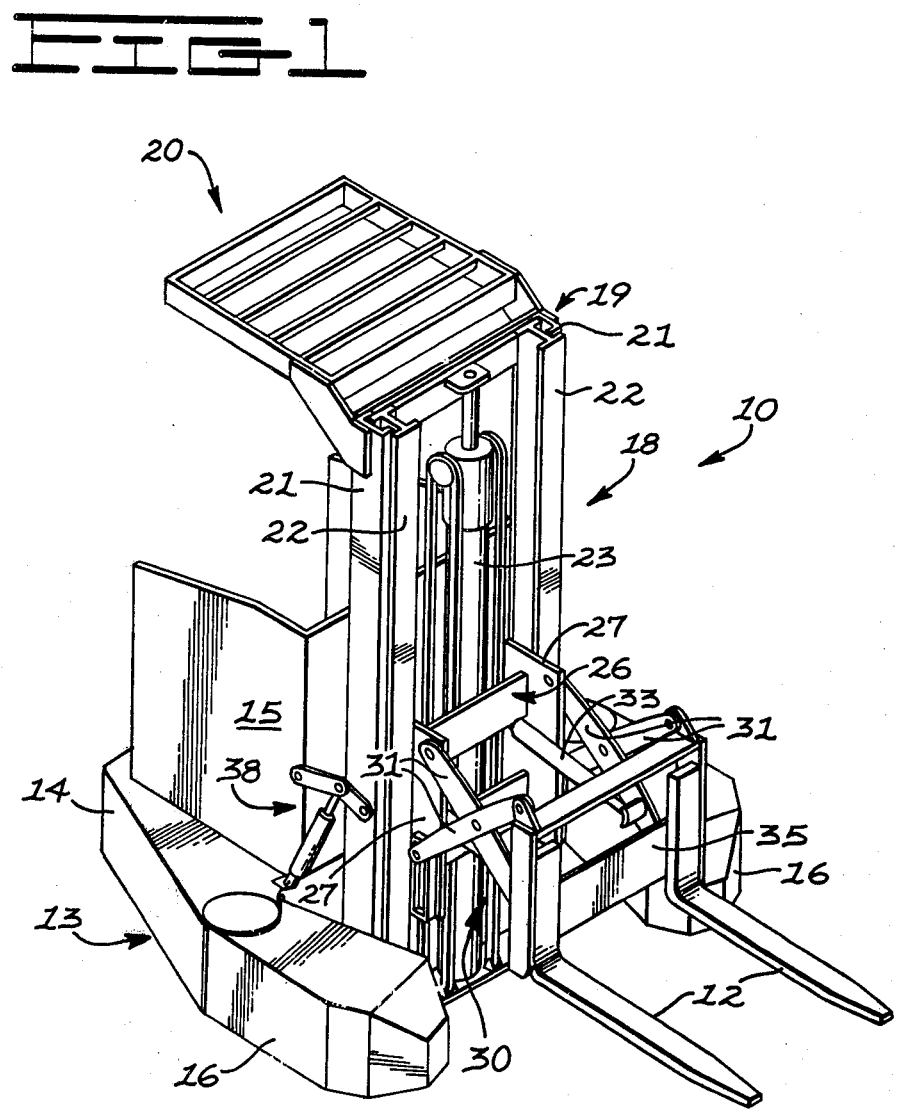
FIG. 1 is a front isometric view of a vehicle embodiment of the present invention that exhibits multi-directional movement capabilities.
Figure 2:
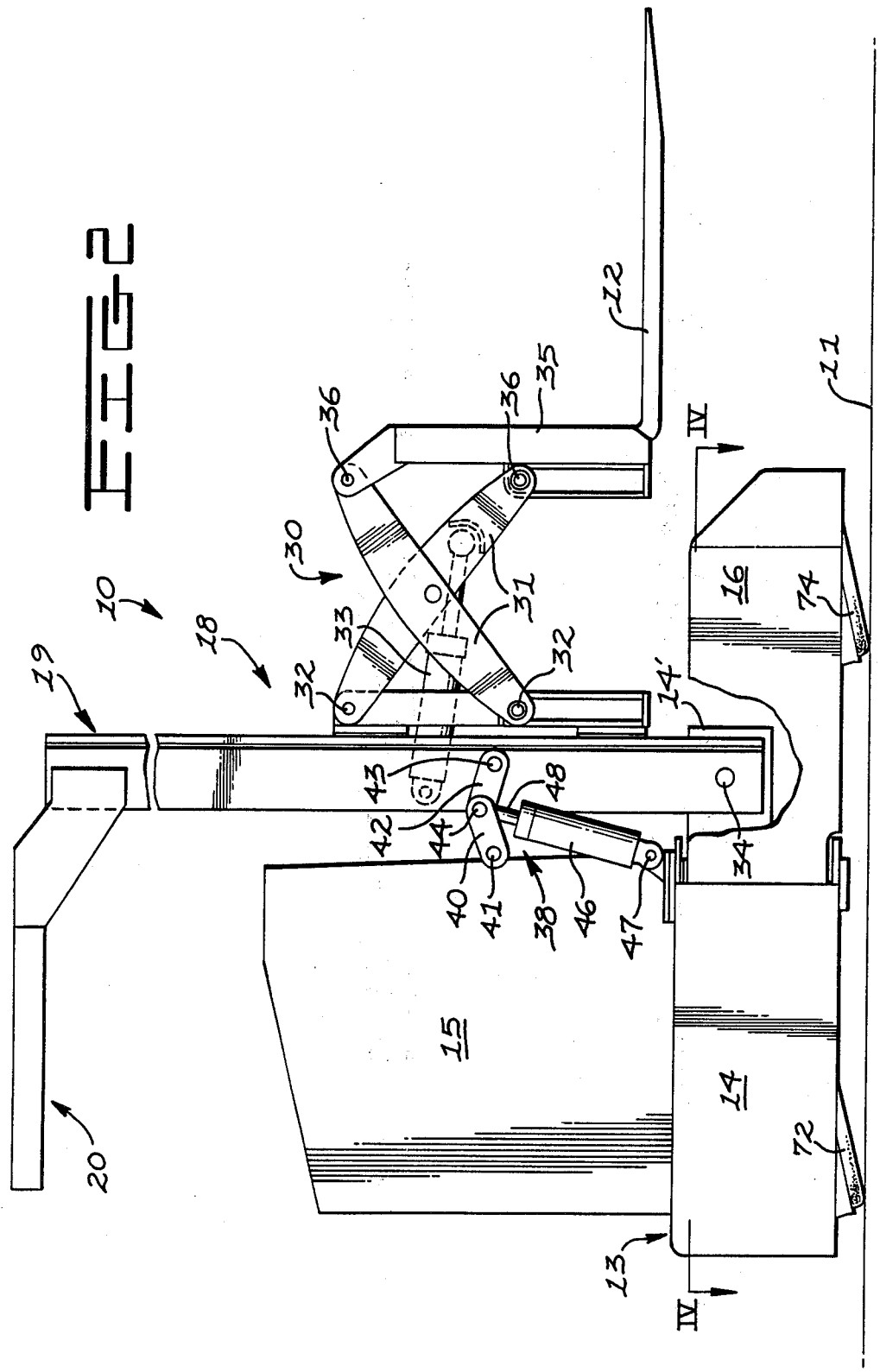
FIG. 2 is an enlarged side elevational view of the vehicle.
Figure 3:
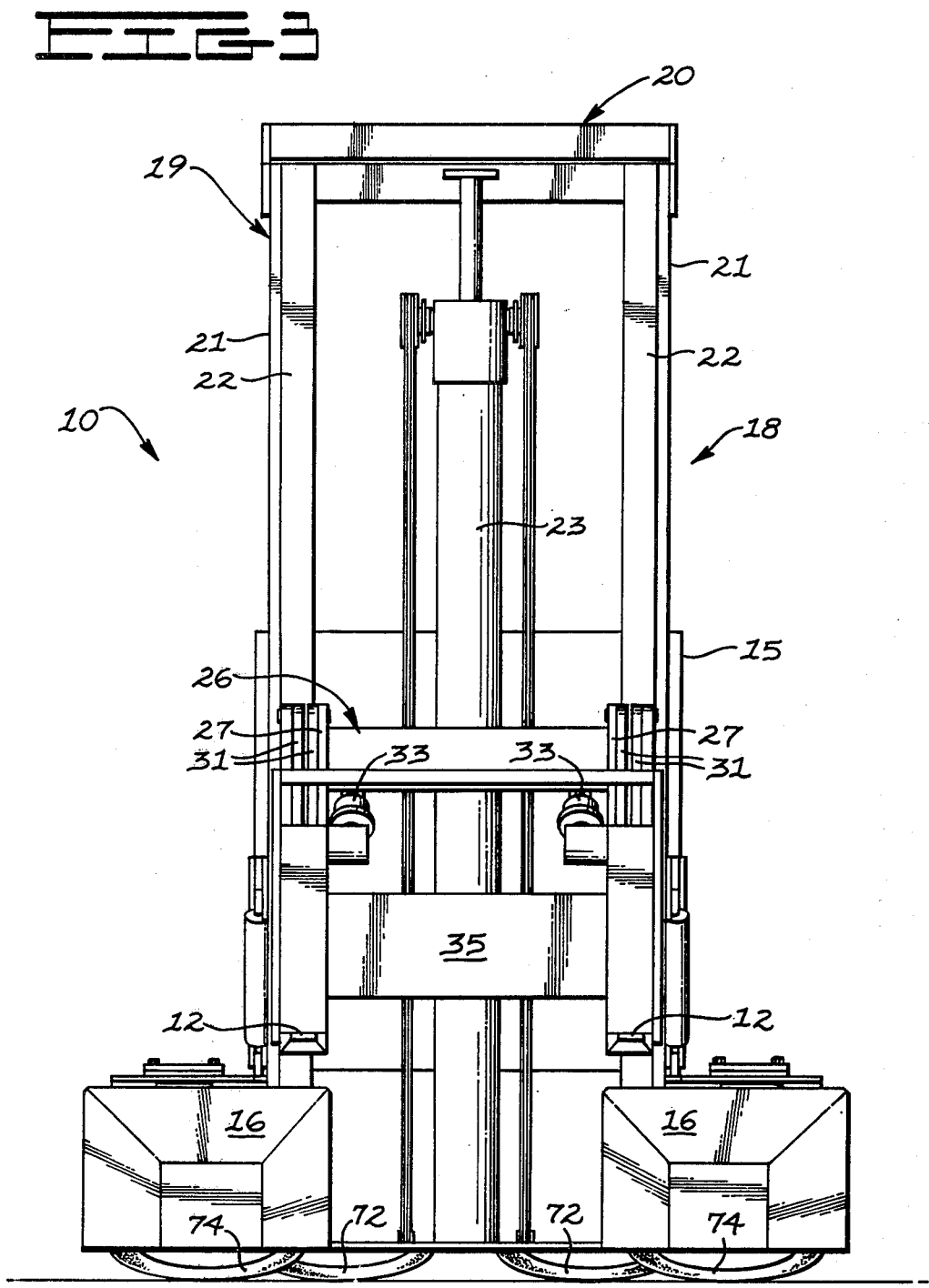
FIG. 3 is a front elevational view of the vehicle.

FIGS. 1-3 illustrate a vehicle 10, shown in the form of a load handling vehicle or lift truck, operable on a supporting surface 11 and having a work tool 12, shown in the form of a pair of load handling arms or lift forks mounted forwardly thereon and selectively movable for load lifting and carrying purposes. The vehicle includes a frame assembly 13 having a rear frame 14 with a partially enclosed operator's station 15, a pair of front frame members or support arms 16 which are substantially identical in construction and arrangement and movable with respect to the rear frame, and an extensible mast assembly 18 having the lift forks mounted thereon.

The mast assembly 18 includes a mast 19, having an overhead guard 20 secured thereto. The mast includes spaced-apart, cooperating pairs of fixed and movable uprights 21 and 22, respectively. The movable uprights are movable along and guided by the fixed uprights in response to selective extension or retraction of an actuator, shown in the form of a double-acting hydraulic cylinder 23. A carriage assembly 26 is mounted to the mast and is elevationally movable on the movable uprights. The carriage assembly comprises a rectangularly-shaped frame having conventional side members or roller brackets 27, as is well known in the art.

Referring to FIG. 2, a reach mechanism 30 is mounted on the carriage assembly 26 for extending and retracting the lift forks 12. In the vehicle embodiment shown, the reach mechanism includes a pair of spaced-apart pantographs 31 pivotally attached at 32 to the carriage and extensible therefrom in response to extension of a pair of double-acting hydraulic cylinders 33. A second frame 35 is pivotally attached at 36 to a distal end of each link of the pantographs and supports the lift forks.

As shown in FIG. 2, the mast assembly 18 is pivotally mounted to forward extensions 14' of rear frame 14 by pins 34 for limited forward tilting movement relative to the rear frame. The vehicle 10 further includes a pair of tilting mechanisms 38 for tilting the mast assembly relative to the frame, each including a first link 40 pivotally attached by a pin 41 to the operator's station 15 and a second link 42 pivotally attached by a pin 43 to the mast assembly. The links are pinned to each other intermediate the operator's station and the mast assembly at a common pivot pin 44. A double-acting hydraulic cylinder 46 is pivotally attached at its first or head end 47 to the operator's station and at its second or rod end 48 to the links at the common pivot pin 44 for tilting the mast assembly toward or away from the vehicle in response to extension or retraction of the cylinders.

Figure 4:
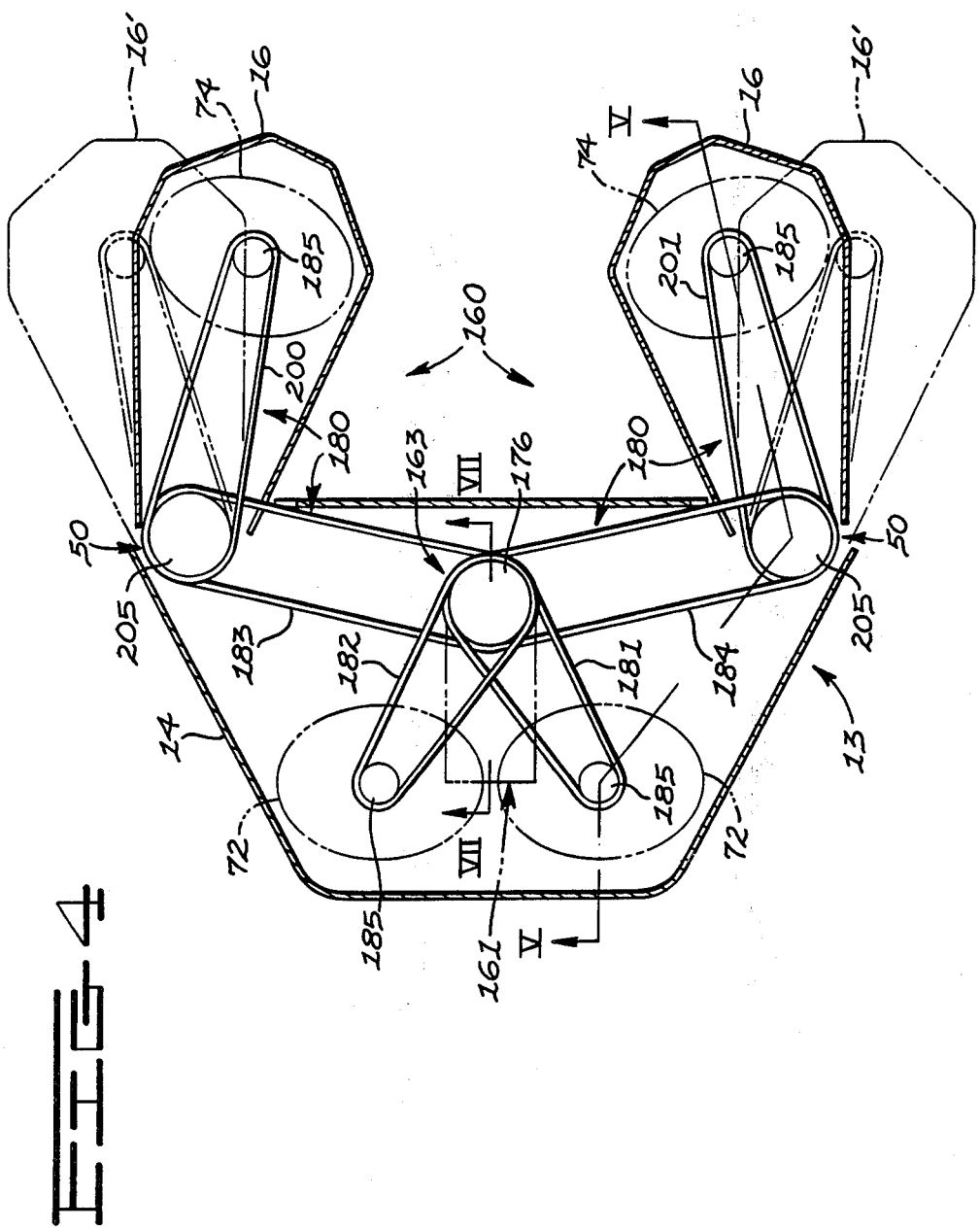
FIG. 4 is a sectional view, generally taken in the direction of arrows IV—IV in FIG. 2, schematically illustrating the disposition of various wheels and a drive mechanism therefor, employed in the vehicle and showing support arms thereof in two positions.
Figure 5:
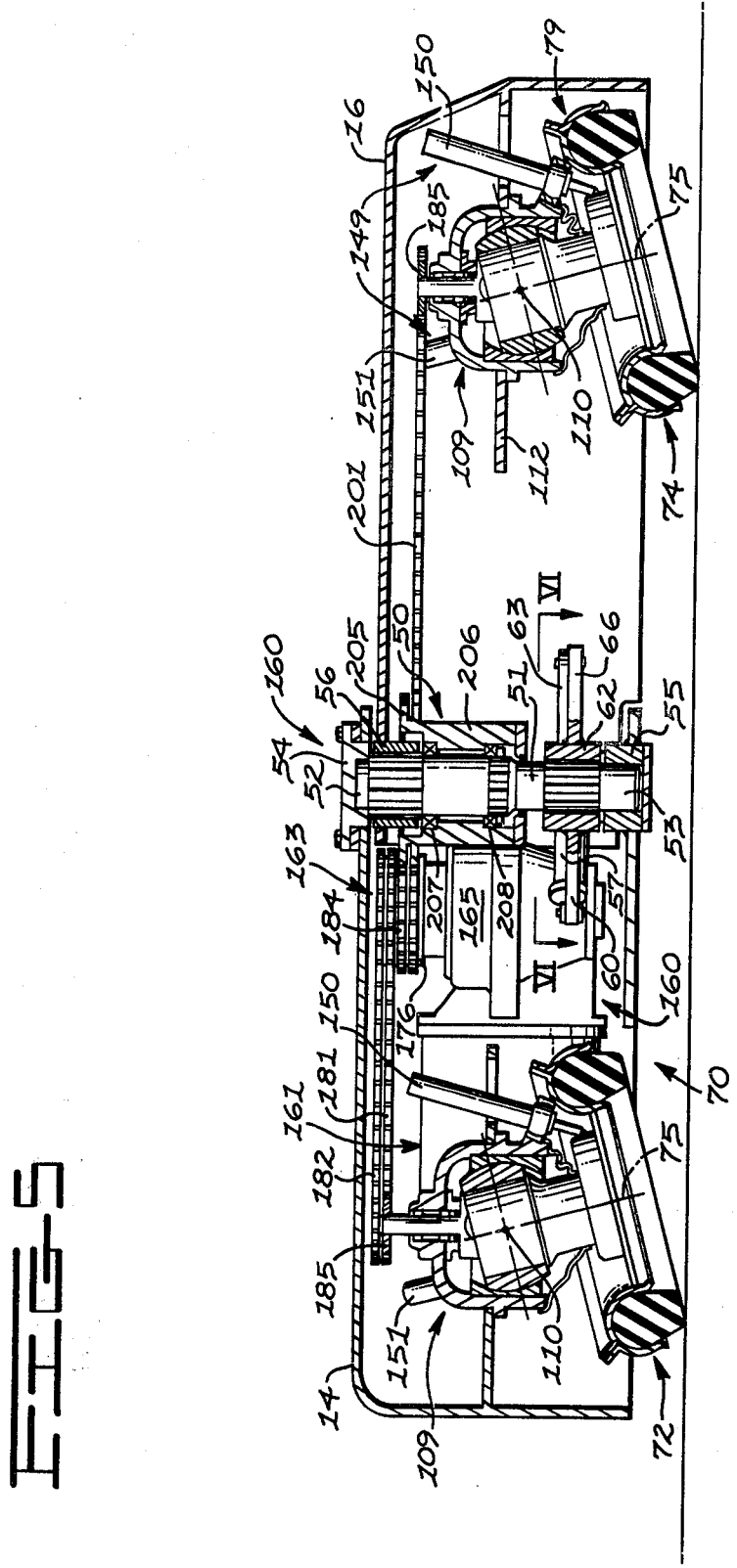
FIG. 5 is an enlarged sectional view of a portion of the vehicle, taken along line V—V in FIG. 4, showing a drive and wheel support system of the vehicle.
Figure 6:
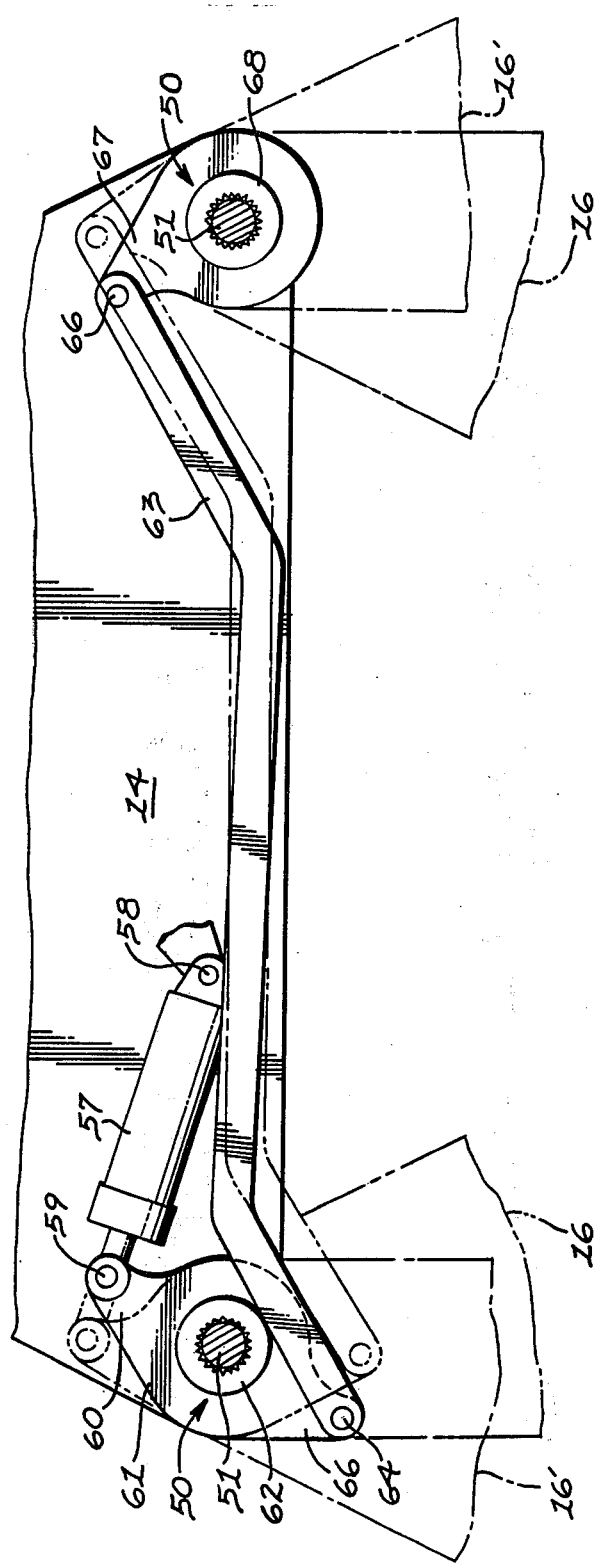
FIG. 6 is an enlarged sectional view of a portion of the vehicle, taken generally in the direction of arrows VI—VI in FIG. 5 showing a pivoting mechanism for a front frame member.

Referring to FIGS. 4–6, the vehicle 10 includes connecting means 50 for individually pivotally connecting each of the front frame members or support arms 16, to the rear frame 14 for movement relative thereto. As best viewed in FIG. 5, each connecting means comprises a shaft 51 pivotally attached to the rear frame. The shaft includes top and bottom bearing portions 52, 53 pivotally mounted on the rear frame by a cap 54 and a journal bearing 55, respectively. Each support arm is secured to a bushing 56 which is splined to the shaft for rotation therewith in response to actuation of a double-acting hydraulic cylinder 57. The cylinder is pivotally connected at 58 to the rear frame and at 59 to an arm 60 of a lever 61 secured to a second bushing 62, splined to the shaft. A tag link 63 is pivotally interconnected at 64, 65 between a second arm 66 of the lever 61 and a second lever 67, secured to a bushing 68 splined to the second shaft 51 (FIG. 6).

Referring to FIGS. 2–5 and 8, a wheel support and drive system 70 provides vehicle 10 with multi-directional movement capabilities on supporting surface or floor 11. The system supports and drives a plurality of wheels 72, 74 each individually mounted on the frame assembly 13 for rotation about a central axis 75 (FIGS. 5 and 8). As schematically shown in FIG. 4, the vehicle has a pair of laterally spaced rear wheels 72 mounted on the rear frame 14 and a pair of laterally spaced front wheels 74, each mounted on a respective front frame 16.

Referring to FIG. 8, one of the wheels 72 and mounting arrangement therefor is illustrated in greater detail. The wheel includes a center wheel member or hub 76 lying in a plane perpendicular to the central axis 75, a rim 77 secured to the hub for supporting a rubber tire 78, and a retainer 79 for retaining the tire in supporting engagement with the rim means.

The rim 77 is in the form of an annular, frusto-conically shaped ring 80 secured to the center wheel member 76 and extending circumferentially thereabout. The ring has a substantially flat top portion or annular flange 81, an arcuate middle portion 82, and a generally curvilinear bottom lip portion 83 having a rounded tip 84. The bottom lip portion flares radially inwardly towards axis 75 and has a smaller diameter than the top portion.

The retainer 79 is in the form of an annular ring 88 including a substantially flat top portion or annular flange 90 for mating engagement with the top portion 81 of the frusto-conically shaped ring 80 and being releasably coupled thereto by means such as a plurality of fasteners, not shown. An arcuate middle portion 91 is aligned with the arcuate middle portion 82 of the ring 80 and cooperating therewith to form an open-ended, toric-shaped, tire-receiving cavity 92. The ring terminates in a generally curvilinear bottom lip portion 93 having a rounded tip 94, flaring radially outwardly from axis 75.

The tire 78 is in the form of a resilient annular tire element 78 having a substantially toric-shaped top portion 100 releasably clamped in the cavity 92 and supported by the cooperating rim and retainer 77, 79. The rim and retainer can be welded, bolted, or otherwise suitably secured together. Radially inner and outer flat side surfaces 101, 102 converge towards each other, axially outwardly from the cavity and terminate at a slightly rounded or crowned tread surface 103 generally lying in a plane which is parallel to the plane of the center wheel member 76.

Still referring to FIG. 8, a mounting arrangement 109 is provided for individually mounting each wheel on the frame assembly 13 for universal movement about a pivot point 110. The mounting arrangement includes a wheel mounting housing 111 secured to the frame by a mounting plate 112 (FIG. 5), the housing having a swivel joint 113 disposed therein and defining the pivot point 110 for universal adjustment of the wheel. The swivel joint includes a semi-spherical bearing socket 114 received in the housing and releasably held therein by suitable retainer 115, such as a snap ring. A mating spherical ball segment 116 is seated in the socket. The ball segment includes first and second oppositely-disposed open ends 117, 118, the ends having a cylindrical bore 119 extending therebetween.

The swivel joint further includes a stop 120 for limiting the pivotal and rotational movement of the ball segment within a predetermined range of angles (e.g., 30° in all directions), including in the direction of arrow X—X in FIG. 8, in a direction perpendicular to such arrow, and in an infinite number of directions therebetween. The stop comprises a generally circular recess 121 formed in the ball segment and a cooperating pin 122 secured in the mating socket 114 and extending into the recess.

A generally cylindrical hub 125, having an open-ended stepped bore 126 extending therethrough, is press-fit or otherwise releasably secured in the bore 119. An axle or spindle 127 is rotatably mounted in bore 126 of the hub. The spindle includes a threaded end portion 128 having the wheel 72 secured thereon by a standard nut 129. The spindle is coaxially aligned with the central axis 75 of the wheel and is supported in the hub for rotation about the axis by the axially spaced bearing assemblies 130, 131.

A sealing arrangement 134 is provided for preventing the ingress of contaminants into the swivel joint 113 and the axially spaced bearing 130, 131 supporting the spindle 127. The sealing arrangement includes an elastomeric boot or bellow-type seal 135 extending circumferentially around and secured between the wheel mounting housing 111 and the hub 125. The sealing arrangement further includes an end face seal assembly 136 positioned intermediate the hub and the wheel in a seal-receiving cavity 137 formed by a recess 138 in a flange 139 extending outwardly from the hub and an axially extending annular rib 140 formed on the wheel member 76.

Referring to FIGS. 5 and 8, the vehicle 10 further includes a wheel adjusting means 149 for selectively and infinitely orienting each of the wheels 72, 74 relative to the supporting surface 11 along an imaginary spherical segment 152 having its center at the pivot point 110 to move the vehicle 10 in any chosen direction. The positioning means includes a pair of actuators, shown in the form of double-acting hydraulic cylinders 150, 151 circumferentially spaced approximately 90° from one another about the central axis 75 of each wheel 72, 74 and radially outwardly from the axis. Each cylinder includes a housing 153 pivotally attached by a swivel ball joint 154 to the wheel mounting housing 111 and an extensible rod 155, pivotally connected by a ball and socket connection 156 to the hub 125.

As will be hereinafter described in greater detail, the positioning means is operative for selectively orienting the wheels individually or in unison to control movement of the vehicle in any chosen direction with or without a change in the vehicle orientation with respect to the supporting surface or floor 11. The positioning means can also position all of the wheels in the same flat plane on surface 11 so that the generally flat bottom tread surfaces 103 of the tires 78 rest flat on the surface to establish a stable base for lifting and placing loads or for parking purposes.

Figure 7:
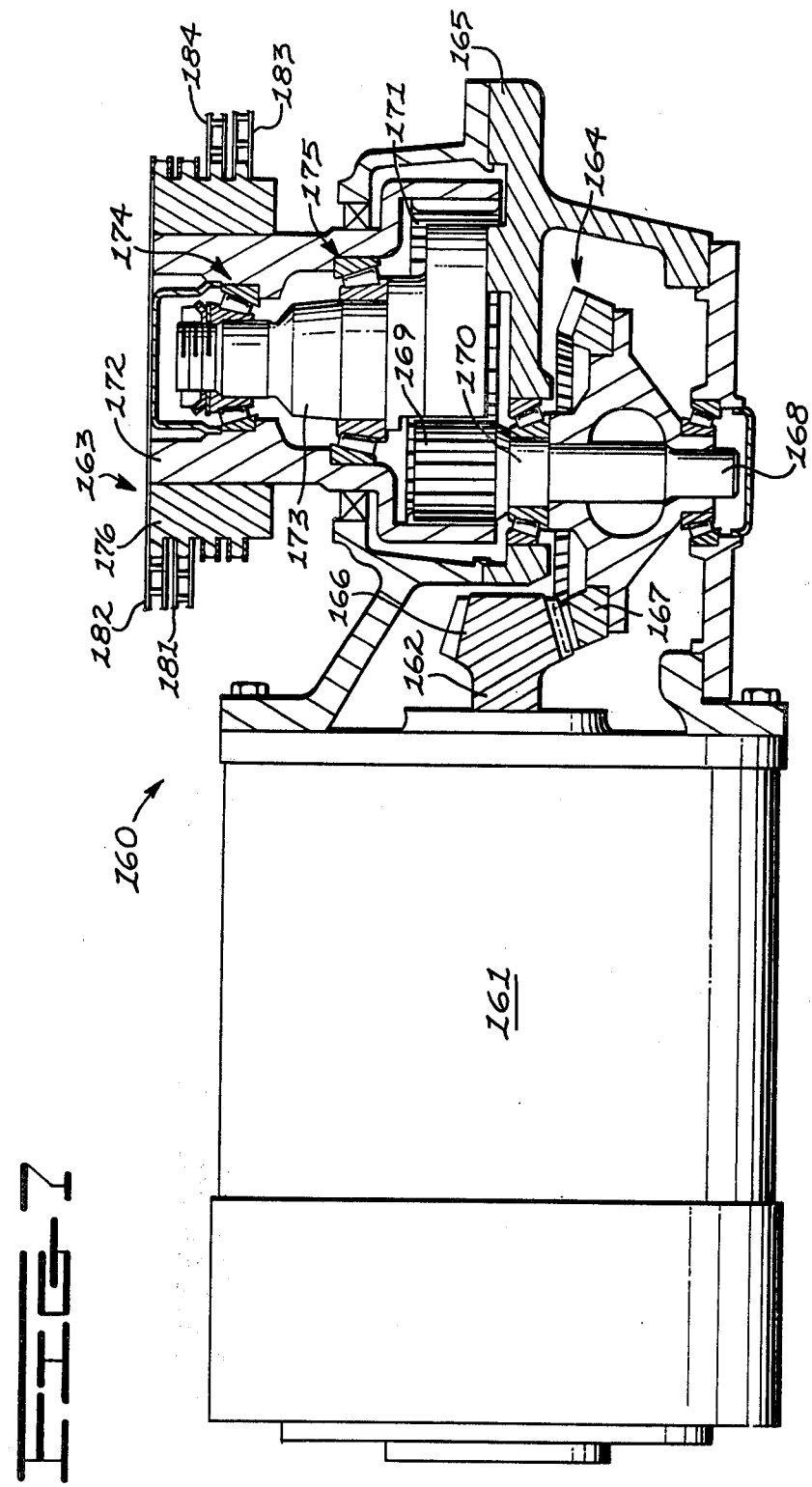
FIG. 7 is an enlarged partial sectional view, taken along line VII—VII in FIG. 4, illustrating a drive motor and transmission arrangement employed in the vehicle for driving the wheels thereof.

Referring to FIGS. 4, 5, and 7, the wheel support and drive system 70 includes a drive system 160 for selectively rotating the wheels 72, 74 simultaneously, the drive system including a prime mover in the form of a drive motor assembly 161 having an output shaft 162 and a drive train illustrated generally by the numeral 163 for drivingly connecting the motor assembly to the wheels. The drive motor assembly may also include a variable speed transmission (not shown), if so desired.

As more clearly shown in FIG. 7, the drive train 163 has a gear set 164 or speed reducer encased in a housing 165 mounted on the drive motor 161 and in driving engagement therewith. The gear set includes a beveled pinion gear 166 secured to the motor output shaft 162 to mesh with a ring gear 167, rotatably mounted in the housing by a shaft 168. A pinion gear 169 is connected to an upper end 170 of the shaft to mesh with an internal ring gear 171 secured to a sprocket hub 172, rotatably supported in the housing by a spindle 173 and bearing assemblies 174, 175. A first or main drive sprocket 176 is secured to the hub for rotation therewith to drive flexible drive means 180, as schematically shown in the form of four endless chains 181, 182, 183 and 184 in FIG. 4.

Referring to FIG. 8, the drive train 163 includes a driven sprocket 185 associated with each of the wheels 72, 74 for transmitting driving torque thereto. According to this embodiment of the present invention, each sprocket is individually secured to an end 186 of a shaft 187 extending from a respective one of the wheel mounting housings 111. The shaft is mounted for rotation therein by a spanner nut 188 and standard bearing 189.

Shaft 187 is coupled to spindle 127 to drive wheel 72 by an Oldham coupling 190 and a Hook's coupling or Cardan type universal joint 191. The coupling will compensate for misalignment whereas the universal joint will facilitate universal adjustment of the wheel by positioning means 149 without disturbing the power transmission to the wheel.

Alternatively, FIG. 9 universal joint 191 may comprise a splined spherical ball 192 secured to the end of the shaft 187. The ball is in driving engagement with internal splines 193 formed in a mating splined bore 194, coaxially disposed in the modified spindle 127. Splines 193 are suitably sized and conically shaped or tapered at their upper ends to permit universal movement of the spindle and wheel about the pivot point 110, at the coincident centers of the swivel joint 113 and the splined ball 192.

Returning now to FIGS. 4 and 5, the chains 181 and 182 are entrained about the main drive sprocket 176 and respective sprockets 185 to drive the wheels 72 mounted on the rear frame 14. Chains 183 and 184 drive the wheels 74, mounted on the front support arms 16, via double idler sprockets 205 and additional chains 200 and 201, respectively. As more clearly shown in FIG. 5, chain 184 is entrained about a sprocket wheel of a respective idler sprocket 205, secured to a hub 206. Chain 201 is entrained about a second sprocket wheel of the idler sprocket and the sprocket 185 associated with a respective wheel 74 for transmitting driving torque thereto. The hub is rotatably mounted on the shaft 51 by suitable bearing assemblies 207 and 208, the shaft being pivotally mounted to the rear frame 14 to permit selective pivotal movement of each front support arm 16 relative to the rear frame in the manner hereinbefore described. Idler sprocket 205 is thus mounted for rotation about a vertical axis common to a vertical pivot axis of the pivotal connection 50.

INDUSTRIAL APPLICABILITY

In operation, the lift truck 10 possesses improved stability during loading and load-carrying operations. Furthermore, the vehicle has infinite movement capabilities which render it particularly useful for operation in close quarters, such as narrow aisles.

The improved stability of the lift vehicle 10 is provided by a combination of a lower center of gravity resulting from the novel wheel configuration and mounting and an outrigger function provided by the movable front frame members 16. For example, to sequentially pick-up and transport a load, the operator will position the vehicle adjacent to the load and then spread the support arms outwardly to their phantom-line positions 16' in FIG. 4. The operator can then extend cylinders 150, 151 the proper amount to place wheels 72, 74 flat on the vehicle supporting surface 11 to establish a stable base for load lifting purposes.

The pantographs 31 (FIG. 1) are then extended forwardly of the vehicle to position the lift forks 12 under the pallet carrying the load. The forks are raised by cylinder 23 to clear the top of the support arms, whereafter the pantographs are retracted by cylinders 33 to place the load closely adjacent to the frame assembly 13 of the vehicle and between the support arms. Moreover, if the vehicle is being operated in a narrow aisle, the support arms may be pivoted inwardly, and the load rested thereon during transport. In either mode of operation, a relatively heavy load may be lifted and moved without the need for additional counterweights being secured rearwardly on the vehicle, which is conventional practice.

Directional steering control of the vehicle 10 is achieved by selectively changing the orientation of the universally adjustable wheels 72, 74 with respect to the supporting surface 11. Each of the wheels is infinitely movable along a spherical segment 152 (FIGS. 8, 9) having its center at the swivel joint 113 in the associated wheel mounting housing 111. Wheel orientation change is effected by extending or retracting one or both of the cylinders 150, 151. The cylinders are hydraulically actuated by a suitable hydraulic control circuit (not shown) operable in response to the movement of a joystick or other suitable steering control means mounted in operator's station 15.

Thus, it can be seen that the vehicle 10 can travel in any direction on the supporting surface 11 without changing the vehicle orientation with respect thereto. This novel steering arrangement permits vehicle movement in the normal forward and reverse directions and also permits the vehicle to crab, i.e. sideways or diagonal movement. Alternatively, the operator may execute a right angle or spot turn by suitably changing the orientation of either the two front wheels, the two rear wheels, or both sets of wheels in opposite directions with respect to the supporting surface. The vehicle, therefore, may advantageously be used to manipulate and transport loads in narrow aisles and other confined spaces where conventional lift trucks cannot maneuver.

Other aspects, objects, and advantages of the invention can be obtained from a study of the drawings, disclosure, and appended claims.

I claim:

1. A vehicle (10) comprising:
    a frame assembly (13);
    a plurality of wheels (72,74) rotatably mounted on the frame assembly (13), each wheel (72,74) being mounted for rotation about a central axis (75);
    means (109) for mounting each of the wheels (72,74) on the frame assembly (13) for universal adjustment about a pivot point (110);
    means (149) for selectively and infinitely adjusting each of the wheels (72,74) about the pivot point (110); and
    drive means (160) for selectively rotating at least one of the wheels (72,74),
    said frame assembly (13) including a rear frame (14) and a pair of front frames (16) pivotally connected to the rear frame (14), a pair of said wheels (72) being mounted on the rear frame (14) and one of said wheels (74) being mounted on each of the front frames (16).

2. The vehicle (10) of claim 1 wherein the mounting means (109) includes:
    a wheel mounting housing (111) secured to the frame assembly (13);
    a swivel joint (113) disposed in the housing (111) and defining the pivot point (110) for universal movement of the wheel (72,74); 'a hub (125) operatively connected to the swivel joint (113); and
    a spindle (127) having a said wheel (72,74) secured thereto, the spindle (127) being coaxially aligned with the central axis (75) of the wheel (72,74) and being rotatably mounted within the hub (125) for rotation about the axis (75).

3. The vehicle (10) of claim 2 wherein the swivel joint (113) includes a semi-spherical socket (114) having a mating spherical ball segment (116) seated therein.

4. The vehicle (10) of claim 3 wherein the hub (125) is secured within the ball segment (116).

5. The vehicle (10) of claim 3 wherein the swivel joint (113) includes stop means (120) for universally limiting pivotal movement of the ball segment (116) in said socket (114).

6. The vehicle (10) of claim 5 wherein the stop means (120) includes a recess (121) formed in the spherical ball segment (116), and a pin (122) secured to the socket (114) and extending into the recess (121).

7. The vehicle (10) of claim 2 wherein the mounting means (109) further includes seal means (134) for preventing ingress of contaminants into the swivel joint (113).

8. The vehicle (10) of claim 7 wherein the seal means (134) includes a flexible seal element (135) extending circumferentially around the hub (125) and secured between the wheel mounting housing (111) and the hub (125).

9. The vehicle (10) of claim 8 wherein the seal means (134) further includes an end face seal assembly (136) mounted between the hub (125) and the wheel (72,74).

10. The vehicle (10) of claim 2 wherein the adjusting means (149) includes:
    at least two cylinders (150,151) connected between the housing (111) and the hub (125), said cylinders (150,151) being spaced radially outwardly and circumferentially about the central axis (75).

11. The vehicle (10) of claim 10 wherein each of the cylinders (150,151) are circumferentially positioned approximately 90° apart about the central axis (75).

12. The vehicle (10) of claim 11 wherein each of the cylinders (150,151) is universally mounted (154,156) between the housing (111) and the hub (125).

13. The vehicle (10) of claim 12 wherein the adjusting means (149) is operative for selectively positioning the respective wheels (72,74) individually to control movement of the vehicle (10) in a chosen direction.

14. The vehicle (10) of claim 2 wherein the adjusting means is operative to position all of the wheels (72,74) in the same flat plane (11).

15. The vehicle of claim 2 wherein the drive means (160) includes:
    a prime mover (161) having an output shaft (162); and
    a drive train (163) drivingly connecting the output shaft (162) to at least one of the plurality of wheels (72,74), the drive train (163) including:
    a gear train (164) drivingly connected to the output shaft (162);
    a first sprocket (176) connected to an output side of gear train (164);
    a second sprocket connected to said spindle (127) for simultaneous rotation therewith; and
    flexible drive means (180) for drivingly interconnecting the first and second sprockets (176,185).

16. The vehicle (10) of claim 15 wherein the gear train (164) includes:
    a beveled pinion gear (166) secured to the output shaft (162);
    a rotatable ring gear (167) drivingly engaging the pinion (166);
    a reduction pinion (169) and said ring gear (167) secured to a rotatable spindle (168); and
    a rotatable hub (172) having the first sprocket (176) secured thereon, the sprocket hub (172) having an internal ring gear (171) secured therein and drivingly engaging the reduction pinion (169).

17. The vehicle of claim 15 further including a housing (165) having the gear train (164) mounted therein, the housing (165) being mounted on said prime mover (161).

18. The vehicle (10) of claim 15 wherein the first sprocket (176) has a plurality of sprocket wheels thereon each connectable to a respective second sprocket (185) by said flexible drive means (180).

19. The vehicle (10) of claim 15 wherein the second sprocket (185) is secured to a shaft (187) rotatably mounted in the wheel mounting housings (111); and means (190) for universally coupling the shaft (187) to a respective one of the wheels (72,74).

20. The vehicle (10) of claim 19 wherein the coupling means (190) includes a universal joint (191) interconnecting the shaft (187) and the spindle (127).

21. The vehicle of claim 20 wherein the universal joint (191) is a Hook's coupling.

22. The vehicle (10) of claim 20 wherein the universal joint (191) includes a splined spherical ball (192) secured to the shaft (187) and drivingly engaging splines (193) formed in the spindle (127).

23. The vehicle (10) of claim 22 wherein the splines (193) are conically shaped and tapered at their upper ends adjacent to said shaft (187).

24. The vehicle (10) of claim 15 wherein the drive train (163) further includes idler sprocket means (205) for transmitting driving torque from the first sprocket (176) to the second sprocket (185).

25. The vehicle (10) of claim 24 wherein the idler sprocket means (205) is mounted for rotation about an axis common to a pivotal axis of the pivotal connection between the rear frame (14) and a respective one of the front frames (16).

26. The vehicle (10) of claim 25 wherein the flexible drive means (180) includes a plurality of endless chains (181,182,183,184,200,201).

27. The vehicle (10) of claim 2 wherein each of the plurality of wheels (72,74) comprises:
 a center wheel member (76) secured to the spindle (127) and being disposed for rotation about the central axis (75);
 a tire (78);
 rim means (77) for supporting the tire (78), the rim means (77) being secured to the center wheel member (76); and
 retainer means (79) for retaining the tire (78) on the rim means (77).

28. The vehicle (10) of claim 27 wherein the rim means (77) includes an annular, frusto-conically shaped ring (80) extending circumferentially around the center wheel member (76), the ring (80) having:
 an annular flange (81);
 an arcuate middle portion (82); and
 a generally curvilinear bottom lip portion (83) having a rounded tip (84) and a smaller diameter than the annular flange (81).

29. The vehicle (10) of claim 28 wherein the retainer means (79) includes an annular ring (88) having:
 an annular flange (90) connected to the annular flange (81) of the ring (80);
 an arcuate middle portion (91) aligned with the arcuate middle portion (82) of the rim means (77) and cooperating therewith to form an open-ended, toric-shaped, tire-receiving cavity (92); and
 a generally curvilinear bottom lip portion (93) having a rounded tip (94).

30. The vehicle (10) of claim 27 wherein the tire (78) includes:
 a resilient annular tire element (78) having a substantially toric-shaped top portion (100) releasably received in the cavity (92);
 radially inner and outer flat side surfaces (101,102) extending in an axially outwardly direction from the cavity (92); and
 a generally flat bottom surface (103); lying in a plane which is parallel to the plane of the center wheel member (76).

31. A drive system (160) for a vehicle (10) having a frame assembly (13), a plurality of wheels (72,74), means (109) for individually mounting each of the wheels (72,74) on the vehicle (10) for swivel movements about a pivot point (110), the mounting means (109) including a housing (111), a hub (125), and a spindle (127) mounted in the hub (125) for rotation about a central axis (75), the drive system comprising:
 motor means (161) for driving an output shaft (162) thereof; and
 a drive train (163) for drivingly connecting the motor means (161) to at least one pair (72) of the plurality of wheels (72,74), the drive train (163) including:
 a gear train (164) in drivingly connected to the output shaft (162) of the motor means (161), the gear train (164) being contained within a housing (165);
 a first sprocket (176), having a plurality of sprocket wheels thereon, connected to the gear train (164);
 a second sprocket (185) for driving each one of said pair (72) of wheels (72,74); and
 flexible drive means (180) for drivingly interconnecting the first and second sprockets (176,185), said gear train (164) including
 a beveled pinion gear (166) secured to the motor output shaft (162);
 a rotatable ring gear (167) drivingly engaging the pinion (166);
 a reduction pinion (169) and said ring gear (167) secured to a rotatable spindle (168); and
 a rotatable sprocket hub (172) having the first sprocket (176) secured thereon, the sprocket hub (172) having an internal ring gear (171) secured therein and drivingly engaging the reduction pinion (169).

32. The drive system (160) of claim 31 further including a housing (165) having the gear train (164) mounted therein, the housing (165) being mounted on the motor means (161).

33. The drive system (160) of claim 31 wherein the first sprocket (176) is secured to the sprocket hub (172) for rotation therewith.

34. The drive system (160) of claim 31 wherein the second sprocket (185) is secured to the end (186) of a shaft (187) rotatably mounted in the wheel mounting housing (111); and
 means (190) for universally coupling the shaft (187) to the associated wheel (72,74).

35. The drive system (160) of claim 34 wherein the coupling means includes a universal joint (191) interconnecting the shaft (187) and the spindle (127).

36. The drive system (160) of claim 35 wherein the universal joint (191) is a Hook's coupling.

37. The drive system (160) of claim 35 wherein the universal joint (191) includes splined spherical ball (192) secured to the shaft (187), the ball (192) drivingly engaging splines (193) formed in the spindle (127).

38. The drive system (160) of claim 37 wherein the splines (193) are conically shaped and tapered at their upper ends adjacent to the shaft (187).

39. The drive system (160) of claim 31 wherein the frame assembly (13) includes a rear frame (14) and a pair of front frames (16) pivotally connected to the rear frame (14), a pair of first wheels (72) of the wheels (72,74) being mounted on the rear frame (14).

40. The drive system (160) of claim 39 wherein a second wheel (74) of the wheels (72,74) is mounted on each of the front frames (16).

41. The drive system (160) of claim 40 further including idler sprocket means (205) for transmitting driving torque from the first sprocket (176) to the second sprocket (185).

42. The drive system (160) of claim 41 wherein the idler sprocket means (205) is mounted for rotation about an axis common to a pivotal axis of the pivotal connection between the rear frame (14) and a respective one of the front frames (16).

43. The drive system (160) of claim 42 wherein the flexible drive means (180) includes a plurality of endless chains (181,182,183,184,200,201).

44. A vehicle wheel (72,74) disposed for rotation about a central axis (75) comprising:
a spindle (127);
a center wheel member (76) secured to a lower end of the spindle (127) for rotation about the central axis (75);
a tire (78);
rim means (77) for supporting the tire (78), the rim means (77) being secured to the center wheel member (76); and
retainer means (79) for retaining the tire (78) on the rim means (77);
said rim means (77) including an annular, frustoconically shaped ring (80) extending circumferentially around the center wheel member (76), the ring (80) having:
an annular flange (81);
an arcuate middle portion (82); and
a generally curvilinear bottom lip portion (83) having a rounded tip (84) and a smaller diameter than the annular flange (81).

45. The vehicle wheel (72,74) of claim 44 wherein the retainer means (79) includes an annular ring (88) having:
an annular flange connected to the annular flange (81) of the ring (80);
an arcuate middle portion (91) aligned with the arcuate middle portion (82) of the rim means (77) and cooperating therewith to form an open-ended, toric-shaped, tire-receiving cavity (92); and
a generally curvilinear bottom lip portion (93) having a rounded tip (94).

46. The vehicle wheel (72,74) of claim 45 wherein the tire (78) includes:
a resilient annular tire element (78) having a substantially toric-shaped top portion (100) releasably received in the cavity (92);
radially inner and outer side surfaces (101,102) extending in an axially outwardly direction from the cavity (92); and
a generally flat bottom surface (103) lying in a plane which is parallel to the plane of the center wheel member (76).

47. In a vehicle (10) having a frame assembly (13), a plurality of wheels (72,74) mounted on the frame assembly (13) for rotation about a central axis (75) and for engagement with a supporting surface (11), means (109) for individually mounting each of the wheels (72,74) on the frame assembly (13), means (149) for selectively orienting the wheels (72,74) relative to the supporting surface (11), and drive means (160) for selectively rotating at least one pair of the wheels (72,74), the improvement comprising:
each of the wheels (72,74) including a center wheel member (76) lying in a plane perpendicular to the central axis (75);
an annular tire (78) for engagement with the supporting surface (11);
annular rim means (77) for supporting the tire (78) thereunder so that the tire projects below the center wheel member (76) and the rim means (77), the rim means (77) being secured to the center wheel member (76); and
retainer means (79) for retaining the tire (78) on the rim means (77),
said mounting means (109) mounting each wheel (72,74) to position it between a rest position whereat the tire (78) rests flat on the supporting surface (11) and tilted positions relative to the supporting surface (11).

* * * * *

UNITED STATES PATENT AND TRADEMARK OFFICE
CERTIFICATE OF CORRECTION

PATENT NO. : 4,411,329
DATED : October 25, 1983
INVENTOR(S) : Robert N. Stedman

It is certified that error appears in the above-identified patent and that said Letters Patent are hereby corrected as shown below:

Claim 30, line 1, delete "27" and insert --29--.

Signed and Sealed this

Tenth Day of January 1984

[SEAL]

Attest:

GERALD J. MOSSINGHOFF

Attesting Officer

Commissioner of Patents and Trademarks